June 30, 1936.  U. E. BOWES  2,046,302
METHOD AND APPARATUS FOR SURFACE TREATING GLASS CONTAINERS
Filed Dec. 26, 1935  3 Sheets-Sheet 1
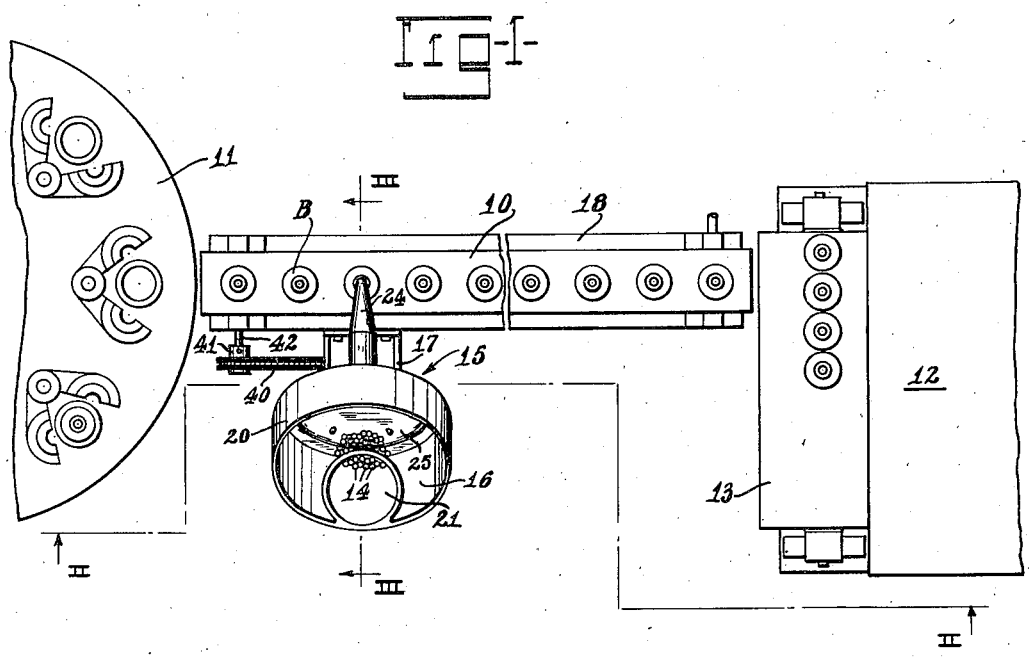
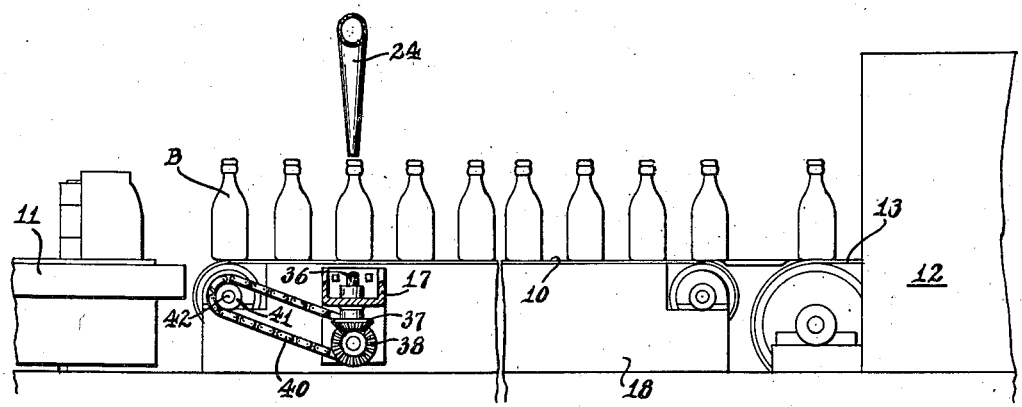
INVENTOR.
U. E. Bowes
BY Rule & Hoge
ATTORNEYS.

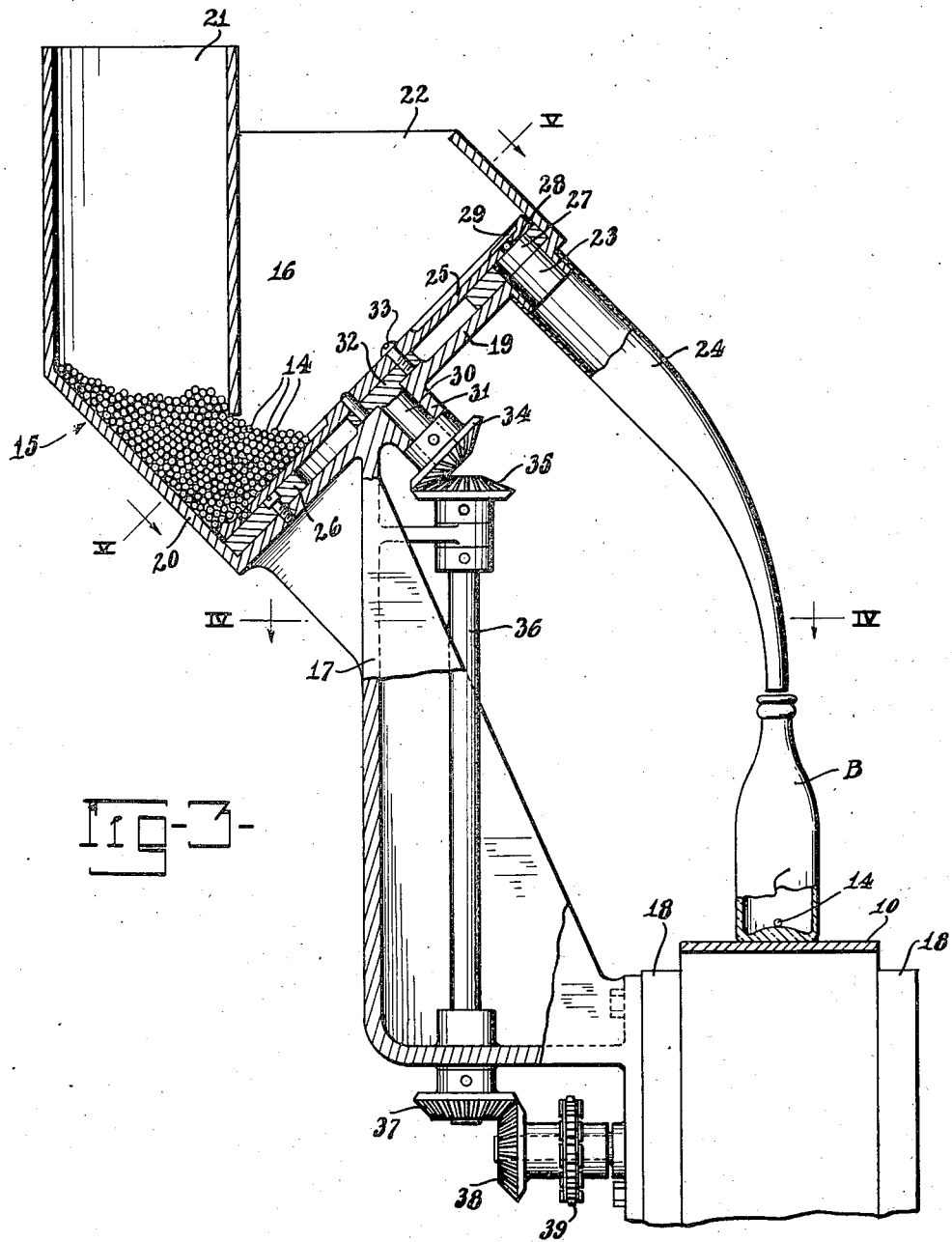

June 30, 1936. U. E. BOWES 2,046,302
METHOD AND APPARATUS FOR SURFACE TREATING GLASS CONTAINERS
Filed Dec. 26, 1935 3 Sheets-Sheet 3
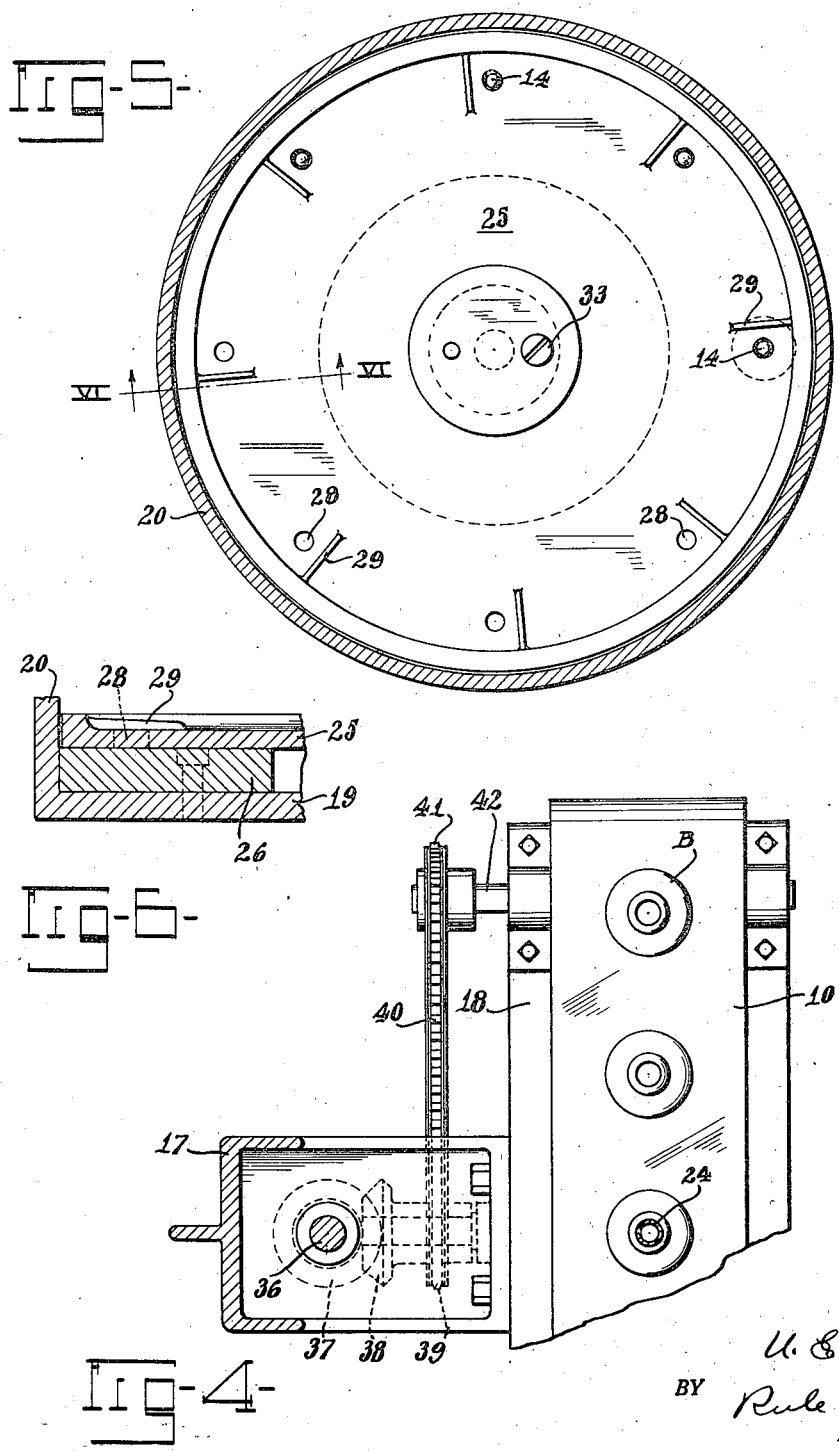
INVENTOR.
U. E. Bowes
BY Rule & Hoge
ATTORNEYS.

Patented June 30, 1936

2,046,302

UNITED STATES PATENT OFFICE 2,046,302

METHOD AND APPARATUS FOR SURFACE TREATING GLASS CONTAINERS

Urban E. Bowes, Toledo, Ohio, assignor to Owens-Illinois Glass Company, a corporation of Ohio Application December 26, 1935, Serial No. 56,204

6 Claims. (Cl. 49—14)

The present invention relates to improvements in methods and apparatus for surface treating glass or other ceramic containers and more particularly the interior surface of bottles and jars.

Glass containers such as bottles and jars, are frequently used in the packaging of liquids which are of such character that over a comparatively short period of time, they leach out the alkali at and in proximity to the interior surface of the glass structure.

An object of the present invention is the provision of a novel method and apparatus for neutralizing the alkali on and adjacent the interior surface of glass bottles and jars whereby to avoid the above noted objection and in addition retard visible weathering of the glass. To this end an acidic gas such for example as sulphur dioxide or trioxide is applied to the interior surface of the containers prior to annealing thereof.

A further object is the provision of novel means whereby sulphur "pellets" or their equivalent may be deposited in the bottles or jars during their transfer from the forming machine to the annealing leer.

Other objects will be in part apparent and in part pointed out hereinafter.

In the drawings:

Fig. 1 is a fragmentary plan view showing my invention operating in conjunction with a forming machine, leer and machine conveyor.

Fig. 2 is a sectional elevational view taken along the line II—II of Fig. 1.

Fig. 3 is a detail sectional view taken substantially along the line III—III of Fig. 1.

Fig. 4 is a sectional view taken substantially along the line IV—IV of Fig. 3.

Fig. 5 is a sectional view taken substantially along the line V—V of Fig. 3.

Fig. 6 is a detail sectional view taken along the line VI—VI of Fig. 5.

The pellet depositing apparatus is shown in operative relation to a machine conveyor 10 which is disposed between, and adapted to convey bottles from, a standard form of bottle machine and a conventional type of annealing leer 12. Bottles B produced on the forming machine 11 may be removed from the molds and placed upon one end of the machine conveyor 10 mechanically, or by hand and in a like manner removed from the opposite end of the machine conveyor and placed upright upon the leer conveyor 13. The machine conveyor is driven in synchronism with the bottle machine operations by any suitable means (not shown). As the bottles or other glass containers move in succession past a given point, sulphur pellets 14 are delivered thereto by a dispenser 15 which is operatively connected to the machine conveyor.

This dispenser includes a hopper 16 which is mounted at the upper end of a supporting arm 17 suitably attached to the frame 18 carrying the machine conveyor 10. The hopper includes a circular bottom wall 19 and a circular side wall 20 disposed at right angles to the bottom wall 19. The hopper has a filling opening 21 and a second opening 22 in juxtaposition thereto, the latter providing for access to the interior whereby to facilitate removal, replacement and/or adjustment of the feeding mechanism, as will be apparent presently. The bottom wall 19 is formed with a discharge port 23 opening directly into the upper end of a nozzle 24 or pipe, the lower or discharge end of which terminates at a level just above the level of the mouth or filling opening of the bottles B or other containers.

Feeding of pellets to the pipe 24 by way of the port 23 is timed with movement of the conveyor 10 and bottles or other containers. To this end, a rotary valve 25 is arranged within the hopper, said valve assuming the form of a disk having rotary sliding contact with a supporting ring 26 or bearing which is attached to the bottom wall 19. This ring 26 is formed with a port 27 of the same diameter as and in register with the discharge port 23. This valve disk or plate is formed with an annular series of discharge openings 28 designed for alignment one at a time with the ports 23 and 27 whereby to discharge the sulphur pellets 14 one at a time into the pipe 24. These openings 28 are of such dimensions that they will accommodate only one pellet at a time. Radially disposed ribs 29 or like devices are formed on one face of the disk 25 for the purpose of agitating the supply of pellets contained in the hopper.

Rotation of the valve disk 25 for the two-fold purpose of bringing the openings 28 one at a time into register with the ports 23 and 27 and agitating the supply of pellets as just pointed out, is obtained by operatively connecting the disk and machine conveyor, the latter being continuously driven by any conventional or preferred means not shown. A stub shaft 30 is journaled in a bearing 31 at the center of the inclined bottom wall 19 and at one end is separably connected through a hub 32 and screw 33. The other end of the shaft carries a bevel gear 34 running in mesh with a bevel gear 35 at the upper end of a shaft 36, which at its lower end carries a bevel gear 37 meshing with a bevel gear 38, the latter being connected by a sprocket wheel 39 and sprocket chain 40 to a sprocket wheel 41 which is mounted upon one end of a shaft 42 forming a part of the machine conveyor unit.

In operation, the bottles or other containers are formed in the molds of the bottle machine 11 and then placed upright upon the machine conveyor 10. The valve 25 and conveyor are operated in synchronism so that as the bottles arrive in succession at a position directly beneath the discharge end of the pipe 24, a sulphur pellet is deposited in the bottle or other container. The heat in the bottle fires the pellet and thereby creates an acidic gas which neutralizes the alkalinity of the interior surface. Various other acidic gases may be introduced into the bottles or jars in the fashion disclosed herein and will be satisfactory. Upon completion of the surface treating operation, the bottles are placed in the annealing leer 12 in which they are tempered in the usual or any preferred manner.

Modifications may be resorted to within the spirit and scope of the appended claims.

I claim:

1. The method of neutralizing the alkalinity of the interior surface of a hollow ceramic article which consists in depositing in the article while the latter is hot, a pellet, which when subjected to the heat of the article, fires and creates an acidic gas.

2. The method of neutralizing the alkalinity of the interior surface of a hollow ceramic article which consists in transferring the article from a forming machine to an annealing leer and depositing in the article during its transfer from the machine to the leer, a pellet which when subjected to the heat of the article, fires and creates an acidic gas.

3. The method which consists in molding a hollow ceramic article, transferring the article to an annealing leer prior to any great loss of heat and depositing in the article during its transfer to the leer, a pellet which when subjected to the heat of the article, fires and creates an acidic gas.

4. The method of neutralizing the alkalinity of the interior surface of a hollow ceramic article which consists in depositing in the article while the latter is hot, a sulphur pellet which when subjected to the heat of the article, fires and creates an acidic gas.

5. In combination, a forming machine adapted to produce hollow ceramic articles, an annealing leer to which the articles are transferred, mechanism arranged to transfer the articles from the machine to the leer and automatic means operating in synchronism with the transferring mechanism for depositing pellets in the articles, said pellets being of a character to burn and create an acidic gas immediately after being deposited in the articles.

6. In combination, a machine for producing hollow ceramic articles, an annealing leer in which the articles are adapted to be tempered, mechanism for transferring the articles from the machine to the leer and an apparatus operating in synchronism with and driven by the article transferring mechanism for depositing sulphur pellets or the like in the bottles during their transfer to the leer.

URBAN E. BOWES.